United States Patent
Kim (10) Patent No.: US 9,346,431 B1
(45) Date of Patent: May 24, 2016

(54) STRUCTURE FOR INSTALLING SIDE AIRBAG

(71) Applicant: HYUNDAI MOBIS CO., LTD, Seoul (KR)

(72) Inventor: Gun Woo Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/802,510

(22) Filed: Jul. 17, 2015

(30) Foreign Application Priority Data

Nov. 17, 2014 (KR) ........................ 10-2014-0160028

(51) Int. Cl.
| | |
|---|---|
| B60R 21/207 | (2006.01) |
| B60R 21/2338 | (2011.01) |
| B60R 21/215 | (2011.01) |
| B60R 21/231 | (2011.01) |

(52) U.S. Cl.
CPC .......... *B60R 21/2338* (2013.01); *B60R 21/207* (2013.01); *B60R 21/215* (2013.01); *B60R 21/23138* (2013.01); *B60R 2021/23146* (2013.01); *B60R 2021/23386* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 6,045,151 | A * | 4/2000 | Wu | ........................ | B60R 21/207 280/728.3 |
| 6,095,602 | A * | 8/2000 | Umezawa | ............. | B60R 21/207 280/730.2 |
| 6,206,410 | B1 * | 3/2001 | Brown | ................... | B60R 21/207 280/728.3 |
| 6,293,580 | B1 * | 9/2001 | Lachat | .................. | B60R 21/207 280/728.3 |
| 6,352,304 | B1 * | 3/2002 | Sorgenfrei | ............ | B60R 21/207 280/730.2 |
| 6,439,597 | B1 * | 8/2002 | Harada | .................. | B60R 21/207 280/728.2 |
| 6,578,911 | B2 * | 6/2003 | Harada | ................. | B60N 2/5825 280/730.2 |
| 7,134,685 | B2 * | 11/2006 | Panagos | ................. | B60R 21/201 280/728.2 |
| 7,178,826 | B2 * | 2/2007 | Acker | .................... | B60R 21/207 280/728.2 |
| 7,331,601 | B2 * | 2/2008 | Tracht | ................... | B60R 21/207 280/728.2 |
| 7,341,275 | B2 * | 3/2008 | Miyake | ................. | B60R 21/207 280/730.2 |

(Continued)

FOREIGN PATENT DOCUMENTS

KR          20-0431750 Y1          11/2006

*Primary Examiner* — Nicole Verley
(74) *Attorney, Agent, or Firm* — Knobbe Martens Olson & Bear LLP (57) ABSTRACT

A structure for installing a side airbag includes: an airbag module; an airbag deployment guide path which is in communication with the outside of the vehicle seat from the accommodating space; first and second covers which surround the outside of the vehicle seat, and have one end inserted into the airbag deployment guide path; a connecting tether which has one end that is positioned at a tip portion in the airbag deployment guide path and connected with one end of each of the first and second covers, and the other end that is positioned in the accommodating space at an outer periphery of the airbag module; and a reinforcing fabric which has one end connected with the other end of the connecting tether, and the other end fixed to the airbag module.

7 Claims, 6 Drawing Sheets

(56) References Cited

U.S. PATENT DOCUMENTS

| | | | | |
|---|---|---|---|---|
| 7,401,806 B2* | 7/2008 | Tracht | B60R 21/207 | 280/728.3 |
| 7,458,603 B2* | 12/2008 | Buono | B60R 21/207 | 280/728.2 |
| 7,543,847 B2* | 6/2009 | Tracht | B60R 21/207 | 280/730.2 |
| 7,562,902 B2* | 7/2009 | Osterhout | B60R 21/207 | 280/728.1 |
| 7,637,531 B2* | 12/2009 | Paruszkiewicz, Jr. | B60R 21/207 | 280/730.2 |
| 7,669,888 B2* | 3/2010 | Sato | B60R 21/207 | 280/730.2 |
| 7,677,594 B2* | 3/2010 | Hazlewood | B60N 2/5883 | 280/728.2 |
| 7,677,596 B2* | 3/2010 | Castro | B60R 21/207 | 280/728.2 |
| 7,681,910 B2* | 3/2010 | Wieczorek | B60R 21/207 | 280/728.2 |
| 7,695,004 B2* | 4/2010 | Inoue | B60R 21/207 | 280/730.2 |
| 7,731,226 B2* | 6/2010 | Zink | B60R 21/207 | 280/730.2 |
| 7,784,819 B2* | 8/2010 | Lawall | B60R 21/207 | 280/728.3 |
| 7,896,388 B2* | 3/2011 | Sugimoto | B60N 2/58 | 280/728.3 |
| 7,909,359 B2* | 3/2011 | Inoue | B60R 21/0134 | 280/730.2 |
| 8,152,197 B2* | 4/2012 | Taguchi | B60R 21/207 | 280/728.2 |
| 8,167,333 B2* | 5/2012 | Tracht | B60R 21/207 | 280/730.2 |
| 8,474,858 B2* | 7/2013 | Urabe | B60R 21/207 | 280/728.2 |
| 8,523,221 B2* | 9/2013 | Muller | | 280/730.2 |
| 8,602,450 B2* | 12/2013 | Schnock | B60R 21/207 | 280/730.2 |
| 8,807,591 B2* | 8/2014 | Nakata | D05B 23/00 | 280/728.3 |
| 8,936,271 B2* | 1/2015 | Festag | B60R 21/207 | 280/730.2 |
| 9,027,958 B2* | 5/2015 | Tracht | B60R 21/207 | 280/728.3 |
| 9,067,559 B2* | 6/2015 | Nii | B60R 21/207 | |
| 9,079,556 B2* | 7/2015 | Tanabe | B60R 21/207 | |
| 9,108,552 B2* | 8/2015 | Awata | B60R 21/207 | |
| 9,283,880 B2* | 3/2016 | Taniguchi | B29C 37/0032 | |
| 9,283,914 B2* | 3/2016 | Fujiwara | B60R 21/207 | |
| 2008/0296941 A1* | 12/2008 | Bederka | B60R 21/207 | 297/216.1 |
| 2014/0312664 A1* | 10/2014 | Tanabe | B60R 21/207 | 297/216.13 |
| 2014/0375028 A1* | 12/2014 | Sahashi | B60R 21/207 | 280/728.3 |
| 2015/0076802 A1* | 3/2015 | Tanabe | B60N 2/68 | 280/730.2 |
| 2015/0336528 A1* | 11/2015 | Tanabe | B60R 21/207 | 280/728.2 |

* cited by examiner

STRUCTURE FOR INSTALLING SIDE AIRBAG

CROSS-REFERENCE TO RELATED APPLICATIONS

This application claims priority to and the benefit of Korean Patent Application No. 10-2014-0160028 filed in the Korean Intellectual Property Office on Nov. 17, 2014, the entire contents of which are incorporated herein by reference.

TECHNICAL FIELD

The present disclosure relates to a structure for installing a side airbag, which enables a side airbag cushion to be operated in a desired direction by stabilizing a deployment direction of an airbag cushion depending on inflation pressure when the airbag cushion installed inside a vehicle seat is operated.

BACKGROUND TECHNOLOGY

In general, a side airbag is a safety device that is mounted in an outer cover at a lateral side of a driver seat and a front passenger seat, and has an airbag cushion that is automatically inflated at the time of a collision accident of a vehicle to protect a driver and an occupant seated in the vehicle from impact produced at the time of a collision of the vehicle.

As an example, Korean Utility Model Registration No. 20-0431750 discloses "Structure for Installing Side Airbag".

SUMMARY

An aspect of the present invention provides a structure for installing a side airbag, which enables a side airbag cushion to be operated in a desired direction by stabilizing a deployment direction of an airbag cushion depending on inflation pressure when the airbag cushion installed inside a vehicle seat is operated.

An embodiment of the present invention provides a structure for installing a side airbag, including: an airbag module which is provided in an accommodating space in a vehicle seat; an airbag deployment guide path which is in communication with the outside of the vehicle seat from the accommodating space, and guides deployment of an airbag cushion that constitutes the airbag module; first and second covers which surround the outside of the vehicle seat, and have one end inserted into the airbag deployment guide path; a connecting tether which has one end that is positioned at a tip portion in the airbag deployment guide path and connected with one end of each of the first and second covers, and the other end that is positioned in the accommodating space at an outer periphery of the airbag module; and a reinforcing fabric which has one end connected with the other end of the connecting tether, and the other end fixed to the airbag module.

The airbag module may include: a cushion cover which is provided in the accommodating space; the airbag cushion which is provided in the cushion cover and deployed along the airbag deployment guide path; an inflator which is provided in the cushion cover, and generates gas and supplies the gas to the airbag cushion so that the airbag cushion is inflated and deployed; and a retainer which is provided in the cushion cover and to which the inflator is fixed.

The one end of the connecting tether may be connected with the first and second covers by sewing.

The one end of the connecting tether may be configured as a bent portion that is bent toward the inside of the airbag deployment guide path, an upper side of the bent portion may be connected with the first cover by a tearable sewed portion, and a lower side of the bent portion may be connected with the second cover by a sewed portion.

The other end of the reinforcing fabric may be connected by sewing with the airbag cushion that constitutes the airbag module.

The connecting tether and the reinforcing fabric may be connected to each other by a connecting member, the connecting member including: a hook which includes a neck portion to which the other end of the connecting tether is connected, and a hooked portion that extends from the neck portion; and a hinge shaft which is fitted into the hooked portion of the hook and to which one end of the reinforcing fabric is connected.

A connecting tether insertion hole may be provided in the vehicle seat so that the number of connecting tether insertion holes corresponds to the number of connecting tethers.

The structure for installing a side airbag according to the embodiment of the present invention has the following effects.

1) The side airbag is prevented from being abnormally deployed due to an elongation percentage of the seat cover when the side bag is deployed, thereby ensuring deployment performance of the side airbag at the time of a broadside collision of the vehicle, and effectively protecting occupants in the vehicle.

2) It is not necessary to recouple a reinforcing fabric to a portion associated with a seat fabric or provide a reinforcing member to prevent the existing side airbag from being abnormally deployed.

3) A material, which is lower in elongation percentage than a material of the seat cover, is applied to the connecting tether, thereby effectively cutting out a portion at which the airbag cushion is deployed when the side airbag is deployed.

4) In the case of the reinforcing fabric of the side airbag, which is coupled with the connecting tether, the existing reinforcing fabric extends, and a connecting structure is installed, such that a separate additional component is not required.

5) Since the reinforcing fabric is configured to be connected with the airbag cushion, the reinforcing fabric may be inflated in direct conjunction with the airbag cushion when the airbag cushion is deployed, and the side airbag cushion may pull the cover, such that the cover may be easily separated.

6) The connecting tethers are formed in a separated type so as to apply concentrated stress to the seat cover, and two or more connecting tethers are installed depending on performance, such that concentrated stress is produced at a local position by pulling the connecting tether when the side airbag is deployed, thereby effectively separating the first cover.

7) In a state in which the connecting tether is connected with the first cover by sewing by the tearable sewed portion, the connecting tether may pull the tearable sewed portion by inflation of the airbag cushion, and may tear the tearable sewed portion.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an embodiment of the present invention will be described in detail with reference to the accompanying drawings. First, in denoting reference numerals to constituent elements of respective drawings, it should be noted that the same constituent elements will be designated by the same reference numerals even though they are shown in different drawings. Further, hereinafter, an embodiment of the present invention will be described, but it is obvious that the technical spirit of the present invention is not restricted or limited thereto, but the embodiment of the present invention may be modified by a person with ordinary skill in the art and may be variously carried out.

In an example of a side airbag, a side airbag cushion is installed in a cushion cover which has a deployment line so that a front side of the cushion cover may be torn, and an inflator, which generates gas and injects the gas into the airbag cushion so that the airbag cushion is inflated and deployed, is installed in the airbag cushion while being fixed to a retainer. A position where the airbag cushion is deployed is a connecting portion with a sewed line formed on the outer cover of the vehicle seat, and the airbag cushion is deployed while the connecting portion is torn, so as to protect the occupant seated in the vehicle.

However, in the case of such an airbag module, since pressure produced by inflation of the airbag cushion is generally applied to the inner side but at a lateral side of the vehicle seat, the airbag cushion would not be accurately deployed toward the deployment position formed at the outer cover of the vehicle seat, but is deployed toward a front side or obliquely toward a rear side inside the vehicle seat, such that the airbag cushion cannot effectively absorb impact energy applied to the occupant, and as a result, the occupant is injured even though the airbag is operated. In addition, due to various variables such as a sewed state of the outer cover of the vehicle seat when manufactured or a difference in raw fabric, the airbag cushion is deployed toward a rear side of the outer cover of the vehicle seat instead of being deployed in a deployment direction, or deployed in the outer cover without tearing the outer cover.

In order to address foregoing, a separate member, which has low elasticity and is connected with the cushion cover, is used to connect a vehicle seat frame, such that the airbag cushion receives expansive force, and the separate member pulls the seat cover so that a cut-out line may be easily cut out, and the airbag cushion may be deployed in an intended direction. However, the configuration is still hard to be actually applied.

A structure for installing a side airbag according to an embodiment of the present invention is characterized by being configured to stabilize a deployment direction of an airbag cushion depending on inflation pressure when an airbag installed inside a vehicle seat is operated, thereby enabling the side airbag to be operated in a desired direction.

First, a configuration of a structure for installing a side airbag according to an embodiment of the present invention will be described.

Figure 1:
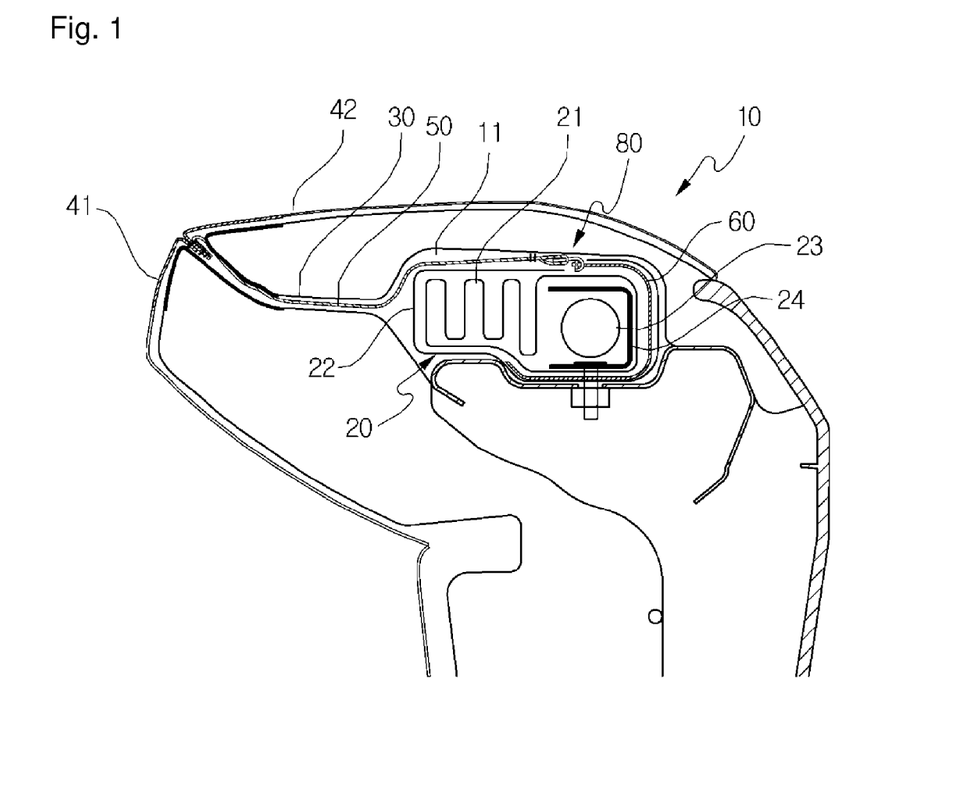
FIG. 1 is a view illustrating an entire configuration according to an embodiment of the present invention.
Figure 2:
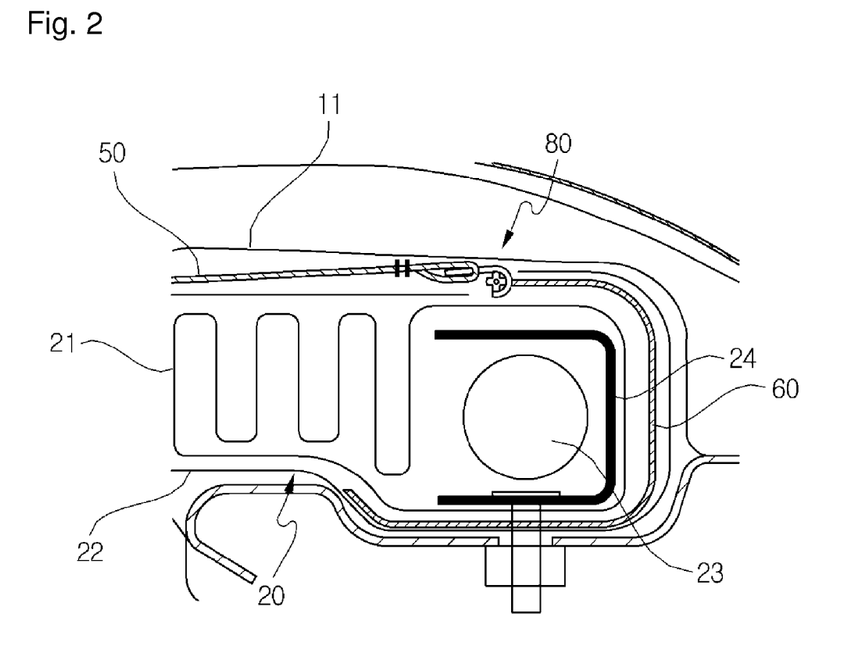
FIG. 2 is an enlarged cross-sectional view illustrating a connecting portion between a connecting tether and a reinforcing fabric according to the embodiment of the present invention.

As illustrated in FIGS. 1 and 2, the structure for installing a side airbag according to the embodiment of the present invention includes an airbag module 20 which is provided in an accommodating space 11 in a vehicle seat, an airbag deployment guide path 30 which guides deployment of an airbag cushion 21, first and second covers 41 and 42 which surround the outside of the vehicle seat 10 and have one end inserted into the airbag deployment guide path 30, a connecting tether 50 which is installed in the airbag deployment guide path 30 and has one end connected with the first and second covers 41 and 42, and a reinforcing fabric 60 which is connected with the connecting tether 50.

Specifically, the airbag module 20 is mounted in the accommodating space 11 provided in the vehicle seat 10. The airbag module 20 includes a cushion cover 22, the airbag cushion 21 installed in the cushion cover 22, a retainer 24, and an inflator 23.

That is, the airbag cushion 21 is installed in the cushion cover 22 which has a deployment line so that a front side of the cushion cover 22 may be torn. The inflator 23 generates gas and injects the gas into the airbag cushion 21 so that the airbag cushion 21 may be inflated and deployed. The inflator 23 is fixed to the retainer 24.

The airbag deployment guide path 30 serves to guide the airbag cushion 21 to be deployed in an intended direction. The airbag deployment guide path 30 is installed in the vehicle seat 10. The airbag deployment guide path 30 is configured to be in communication with the outside of the vehicle seat 10 from the accommodating space 11.

The first and second covers 41 and 42 serve to surround the outside of the vehicle seat 10. One end of each of the first and second covers 41 and 42 is inserted into a tip portion of the airbag deployment guide path 30 and connected with the connecting tether 50 by sewing.

The connecting tether 50 is installed across the airbag deployment guide path 30 and the accommodating space 11. One end portion of the connecting tether 50 is positioned at the tip portion in the airbag deployment guide path 30. The other end of the connecting tether 50 is positioned in the accommodating space 11 at an outer periphery of the airbag cushion 21. One end of the connecting tether 50 is connected by sewing with the one end of each of the first and second covers 41 and 42 inserted into the tip portion of the airbag deployment guide path 30.

Figure 3:
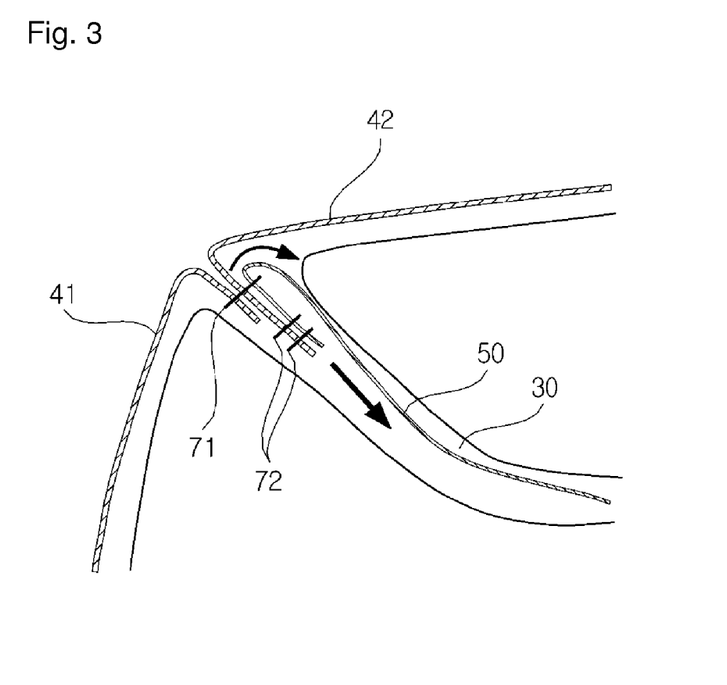
FIGS. 3 to 5 are views illustrating an operational sequence of the connecting tether according to the embodiment of the present invention.

Meanwhile, the one end of the connecting tether 50 is configured as a bent portion 51 that is bent toward the inside of the airbag deployment guide path 30. As illustrated in FIG.

3, an upper side of the bent portion 51 is connected with the one end of the first cover 41 by a tearable sewed portion 71, and a lower side of the bent portion 51 is connected with the second cover 42 by a sewed portion 72. When the airbag cushion 21 is deployed, the tearable sewed portion, which connects the bent portion 51 and the first cover 41, is torn by pulling the connecting tether 50. The bent portion 51 and the second cover 42 may be sewed (72) two or more times.

Two or more connecting tethers 50 may be provided depending on performance. Force, which pulls the connecting tether 50, is applied to the first cover 41 as concentrated stress and releases the tearable sewed portion 71, such that the first cover 41 may be easily separated.

The reinforcing fabric 60 is installed in the accommodating space 11. One end of the reinforcing fabric 60 is connected with the other end of the connecting tether 50. The other end of the reinforcing fabric 60 may be connected with the airbag cushion 21 by sewing. In order to securely couple the reinforcing fabric 60, the reinforcing fabric 60 may be coupled to the retainer 24 by a coupling member such as a bolt and a nut.

The reinforcing fabric 60 connected to the airbag cushion 21 and the connecting tether 50 serve to guide deployment of the airbag cushion 21, and as a result, the airbag cushion 21 may be deployed in a desired deployment direction.

Figure 7:
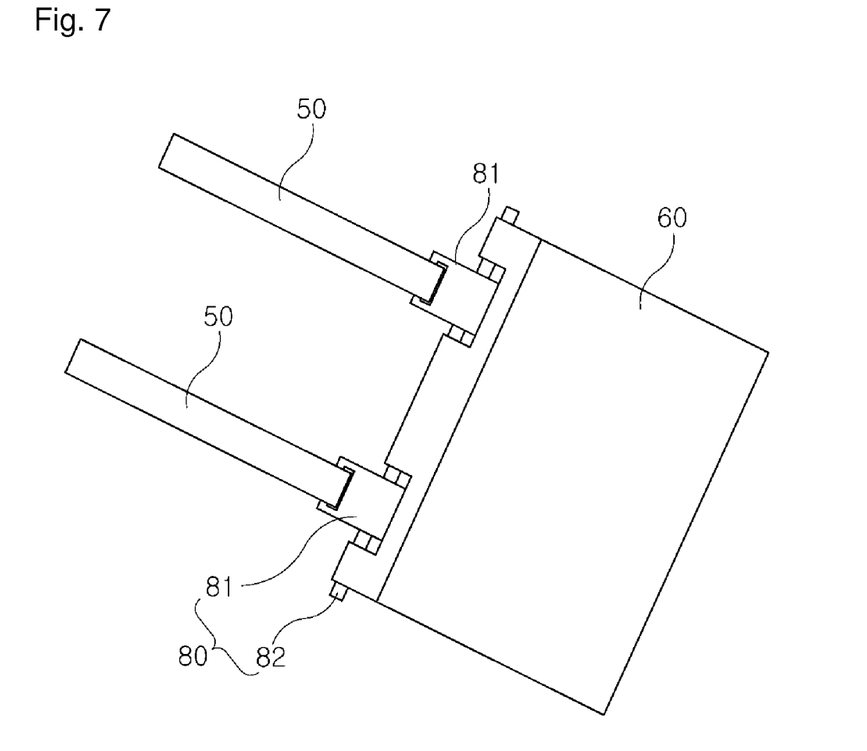
FIG. 7 is an enlarged perspective view of a connecting member according to the embodiment of the present invention.
Figure 8:
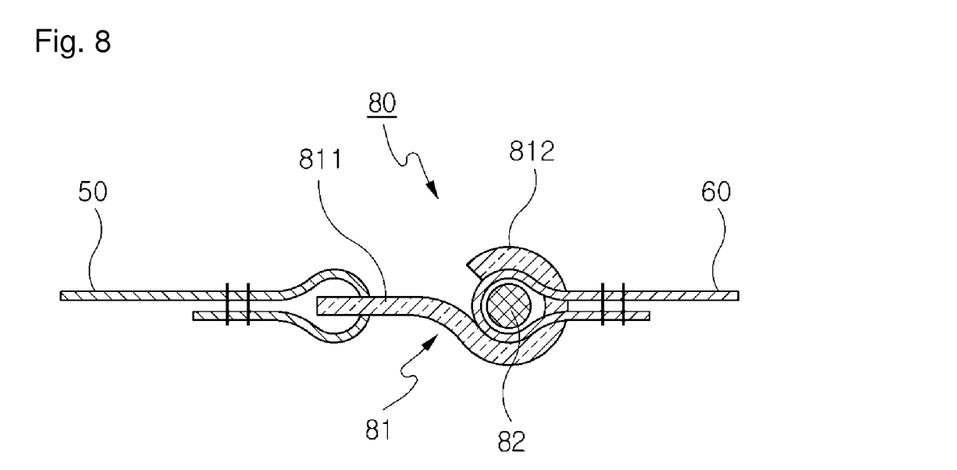
FIG. 8 is an enlarged side view of the connecting member according to the embodiment of the present invention.

The connecting tether 50 and the reinforcing fabric 60 may be connected to each other by a connecting member 80. As illustrated in FIGS. 7 and 8, the connecting member 80 includes a hook 81 which has one side connected with the other end of the connecting tether 50, and a hinge shaft 82 which is coupled to the inside of the other side of the hook 81 so as to be coupled to one side of the reinforcing fabric 60.

Specifically, the hook 81 includes a neck portion 811 to which the other end of the connecting tether 50 is connected, and a hooked portion 812 which extends from the neck portion 811. The hinge shaft 82 to which the one end of the reinforcing fabric 60 is connected is coupled to the hooked portion 812. The one end of the reinforcing fabric 60 may be connected to the hinge shaft 82 by sewing. The other end of the connecting tether 50 may also be connected to the neck portion 811 of the hook 81 by sewing. The connecting tether 50 and the reinforcing fabric 60 may be tightly and tensely connected rather than loosely connected.

Figure 9:
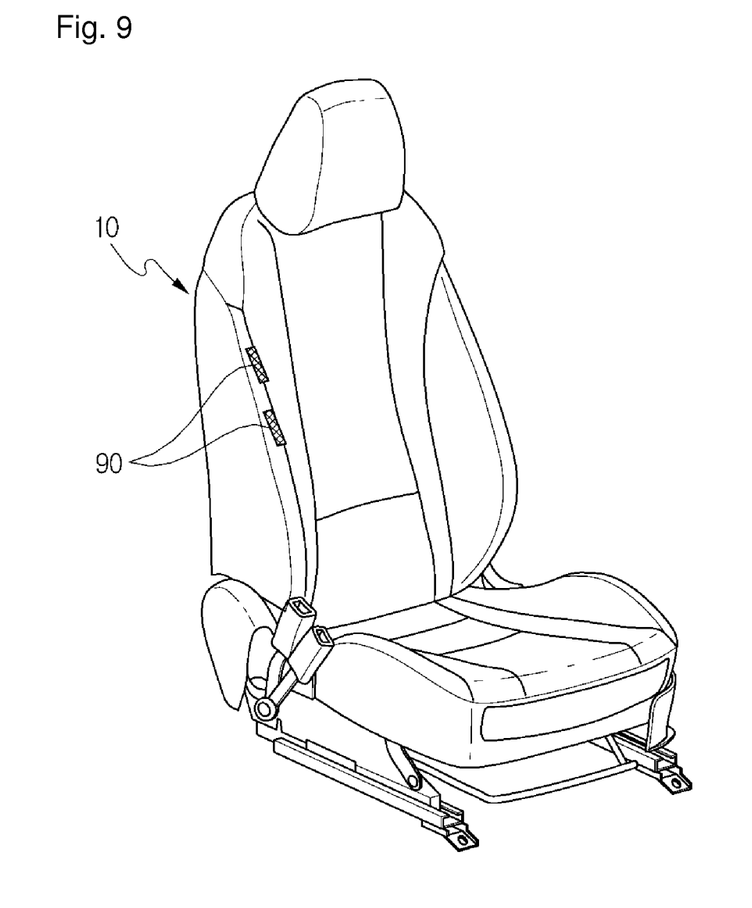
FIG. 9 is a view illustrating a connecting tether insertion hole according to the embodiment of the present invention.

As illustrated in FIG. 9, insertion holes 90 for the connecting tethers 50 may be provided in the vehicle seat 10 so that the connecting tethers 50 may be inserted into the insertion holes 90, and the number of insertion holes 90 corresponds to the number of connecting tethers 50. That is, in order to couple the connecting tether 50 to the reinforcing fabric 60, vehicle seat foam is cut out at a position of the connecting tether 50 when a vehicle seat cover is formed so that the connecting tether 50 may penetrate the insertion hole 90 formed by cutting out the vehicle seat foam, and the connecting tether 50 penetrates the insertion hole 90 so as to be assembled.

The insertion hole 90 may allow the vehicle seat foam to be smoothly separated while the connecting tether 50 is pulled when the airbag cushion 21 is deployed. Therefore, it is possible to improve deployment performance of the airbag cushion 21 in comparison with the vehicle seat foam in the related art which is configured to be fully sealed.

Next, a process in which the side airbag is deployed in the structure for installing a side airbag according to the embodiment of the present invention will be described.

As illustrated in FIG. 3, when gas generated by the inflator 23 is injected into the airbag cushion 21, the airbag cushion 21 is deployed. The airbag cushion 21 pulls the reinforcing fabric 60 and the connecting tether 50 connected with the reinforcing fabric 60 while being deployed. As the connecting tether 50 is pulled, the tearable sewed portion 71 is easily torn with only a small amount of force, as illustrated in FIG. 4.

Figure 4:
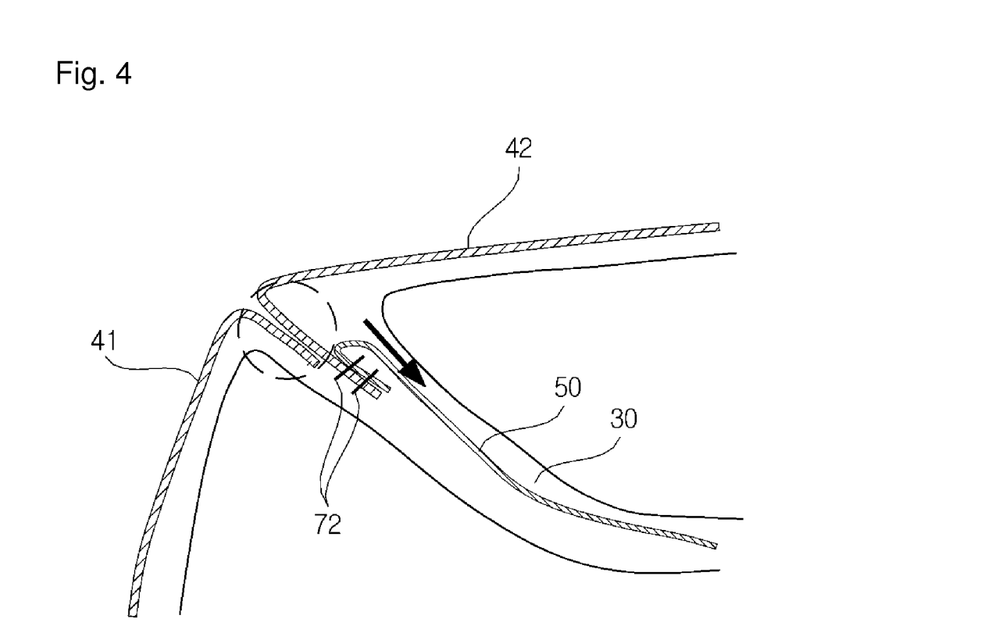
Figure 5:
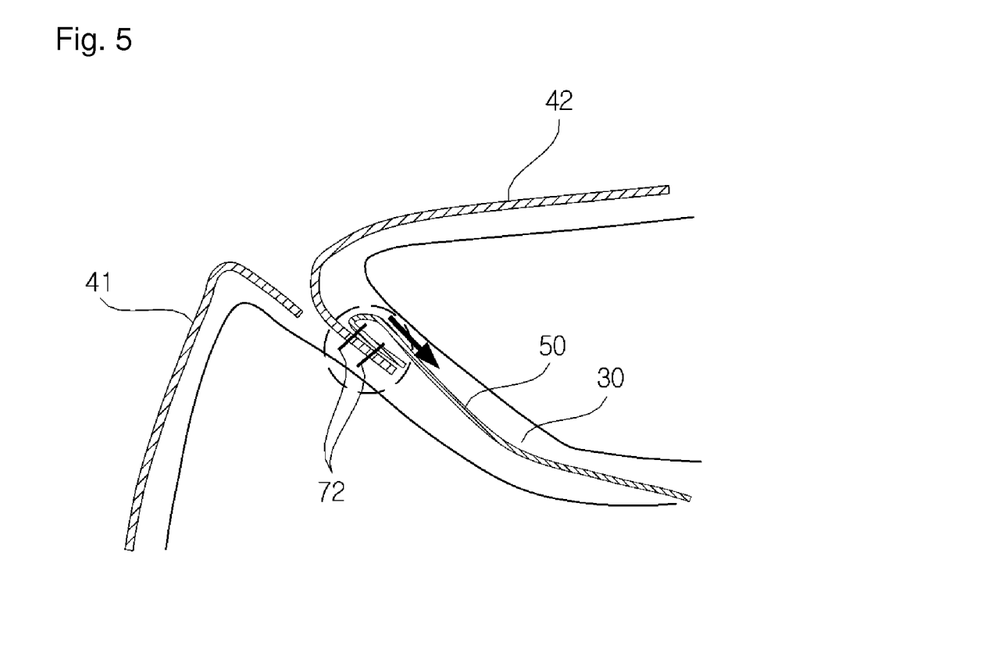

As illustrated in FIG. 4, when the tearable sewed portion 71 is torn, the connecting tether 50 and the first cover 41 are disconnected from each other, and as a result, the first cover 41 is separated. As the connecting tether 50 connected with the second cover 42 is consistently pulled by inflation of the airbag cushion 21 in a state in which the tearable sewed portion 71 is torn, the second cover 42, which is connected with the connecting tether 50 by the sewed portion 72, is further pulled as illustrated in FIG. 5.

Figure 6:
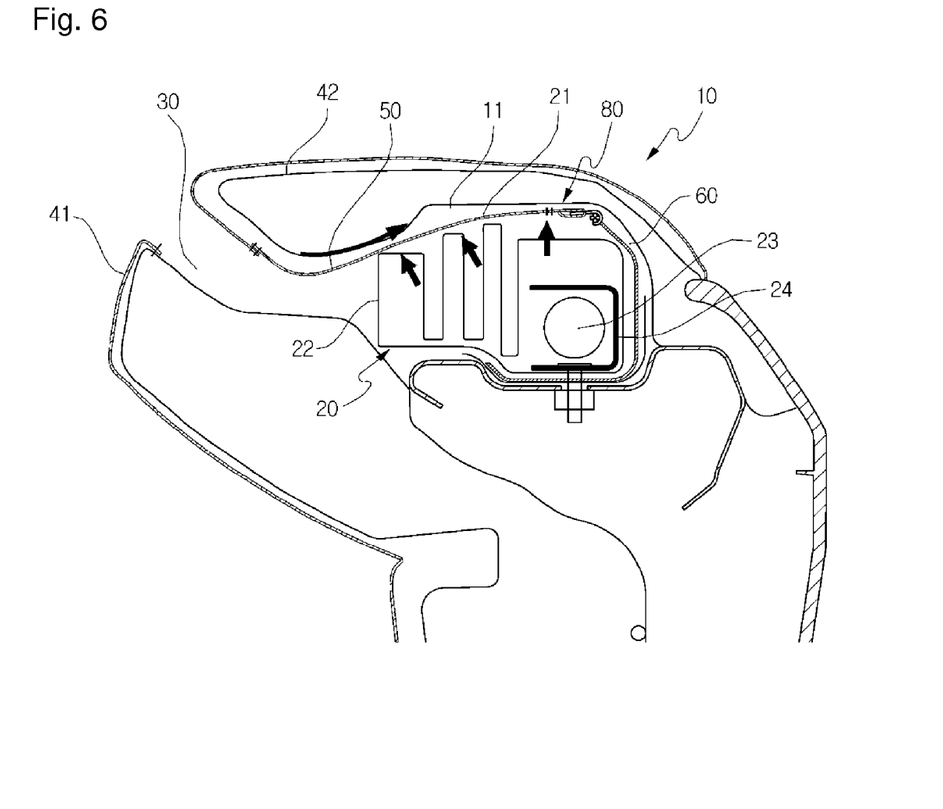
FIG. 6 is a view illustrating a state in which an airbag deployment guide path according to the embodiment of the present invention is opened.

As described above, since the reinforcing fabric 60 pulls the connecting tether 50 while the airbag cushion 21 is inflated by gas generated by the inflator 23, the airbag deployment guide path 30 is fully opened as illustrated in FIG. 6. In this state, the airbag cushion 21 is deployed in a desired deployment direction along the airbag deployment guide path 30.

In other words, since the connecting tether 50 is installed in the airbag deployment guide path 30, it is possible to prevent the airbag cushion 21 from being deployed in a direction that is different from a direction toward a desired deployment position when the airbag cushion 21 is inflated. For this reason, it is possible to improve performance of the side airbag and safely protect occupants seated in a driver seat and a front passenger seat in the vehicle.

As described above, according to the structure for installing a side airbag according to the embodiment of the present invention, since the connecting tether 50 is connected to the airbag cushion 21, it is possible to prevent the airbag cushion 21 from being deployed in a direction that is different from a direction toward a deployment position when the airbag cushion 21 is inflated. For this reason, it is possible to improve performance of the side airbag and safely protect occupants seated in the driver seat and the front passenger seat in the vehicle from impact produced at the time of a broadside collision of the vehicle.

According to the structure for installing a side airbag according to the embodiment of the present invention, since the connecting tether 50 is connected with the airbag cushion 21 that is being deployed, the airbag cushion 21 directly pulls the connecting tether 50 while being inflated. Therefore, even in a case in which urethane foam in the vehicle seat 10 is contracted and pushed, a portion between the first and second covers may be stably opened by pulling the connecting tether 50 connected to the first cover 41.

According to the structure for installing a side airbag according to the embodiment of the present invention, since the connecting tether 50 is connected directly to the tearable sewed portion 71 that may be torn, the connecting tether 50 directly tears the tearable sewed portion 71 when the airbag cushion 21 is deployed, and as a result, the tearable sewed portion 71 may be torn with only a small amount of force. As described above, since the tearable sewed portion 71 is torn with a small amount of force, it is possible to prevent the vehicle seat cover from being abnormally cut out.

The first and second covers 41 and 42 generally have a significantly high elongation percentage of 150 to 200%, and as a result, as the first and second covers 41 and 42 are extended when the airbag cushion 21 is deployed, deployment performance of the airbag cushion 21 may be degraded. However, a material of the connecting tether 50 according to the embodiment of the present invention has an elongation percentage of 30 to 60%, such that when the airbag cushion 21 is deployed, the connecting tether 50 pulls the first cover 41 without being extended, and separates the first cover 41, thereby improving deployment performance of the airbag cushion 21.

A portion where the airbag module 20 is fixed is coupled to the connecting tether 50 at an end portion that extends from a fixed portion between the retainer 24 and the inflator 23. Further, since the reinforcing fabric 60 is connected with the airbag cushion 21 by sewing, the reinforcing fabric 60 is inflated together with the airbag cushion 21 when the airbag cushion 21 is inflated. As described above, since the reinforcing fabric 60 is inflated together with the airbag cushion 21 when the airbag cushion 21 is inflated, it is possible to effectively pull the connecting tether 50.

As described above, the embodiments have been described and illustrated in the drawings and the specification. The embodiments were chosen and described in order to explain certain principles of the invention and their practical application, to thereby enable others skilled in the art to make and utilize various embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A structure for installing a side airbag, comprising:
    an airbag module which is provided in an accommodating space in a vehicle seat;
    an airbag deployment guide path which is in communication with the outside of the vehicle seat from the accommodating space, and guides deployment of an airbag cushion that constitutes the airbag module;
    first and second covers which surround the outside of the vehicle seat, and have one end inserted into the airbag deployment guide path;
    a connecting tether which has one end that is positioned at a tip portion in the airbag deployment guide path and connected with one end of each of the first and second covers, and the other end that is positioned in the accommodating space at an outer periphery of the airbag module; and
    a reinforcing fabric which has one end connected with the other end of the connecting tether, and the other end fixed to the airbag module.

2. The structure of claim 1, wherein the airbag module includes:
    a cushion cover which is provided in the accommodating space;
    the airbag cushion which is provided in the cushion cover and deployed along the airbag deployment guide path;
    an inflator which is provided in the cushion cover, and generates gas and supplies the gas to the airbag cushion so that the airbag cushion is inflated and deployed; and
    a retainer which is provided in the cushion cover and to which the inflator is fixed.

3. The structure of claim 1, wherein the one end of the connecting tether is connected with the first and second covers by sewing.

4. The structure of claim 1, wherein the one end of the connecting tether is configured as a bent portion that is bent toward the inside of the airbag deployment guide path, an upper side of the bent portion is connected with the first cover by a tearable sewed portion, and a lower side of the bent portion is connected with the second cover by a sewed portion.

5. The structure of claim 1, wherein the other end of the reinforcing fabric is connected by sewing with the airbag cushion that constitutes the airbag module.

6. The structure of claim 1, wherein the connecting tether and the reinforcing fabric are connected to each other by a connecting member, the connecting member including: a hook which includes a neck portion to which the other end of the connecting tether is connected, and a hooked portion that extends from the neck portion; and a hinge shaft which is fitted into the hooked portion of the hook and to which one end of the reinforcing fabric is connected.

7. The structure of claim 1, wherein a connecting tether insertion hole is provided in the vehicle seat so that the number of connecting tether insertion holes corresponds to the number of connecting tethers.

* * * * *